Sept. 13, 1966 T. S. GATES ETAL 3,272,075
GEAR FINISHING MACHINE
Filed Dec. 14, 1964 2 Sheets-Sheet 1
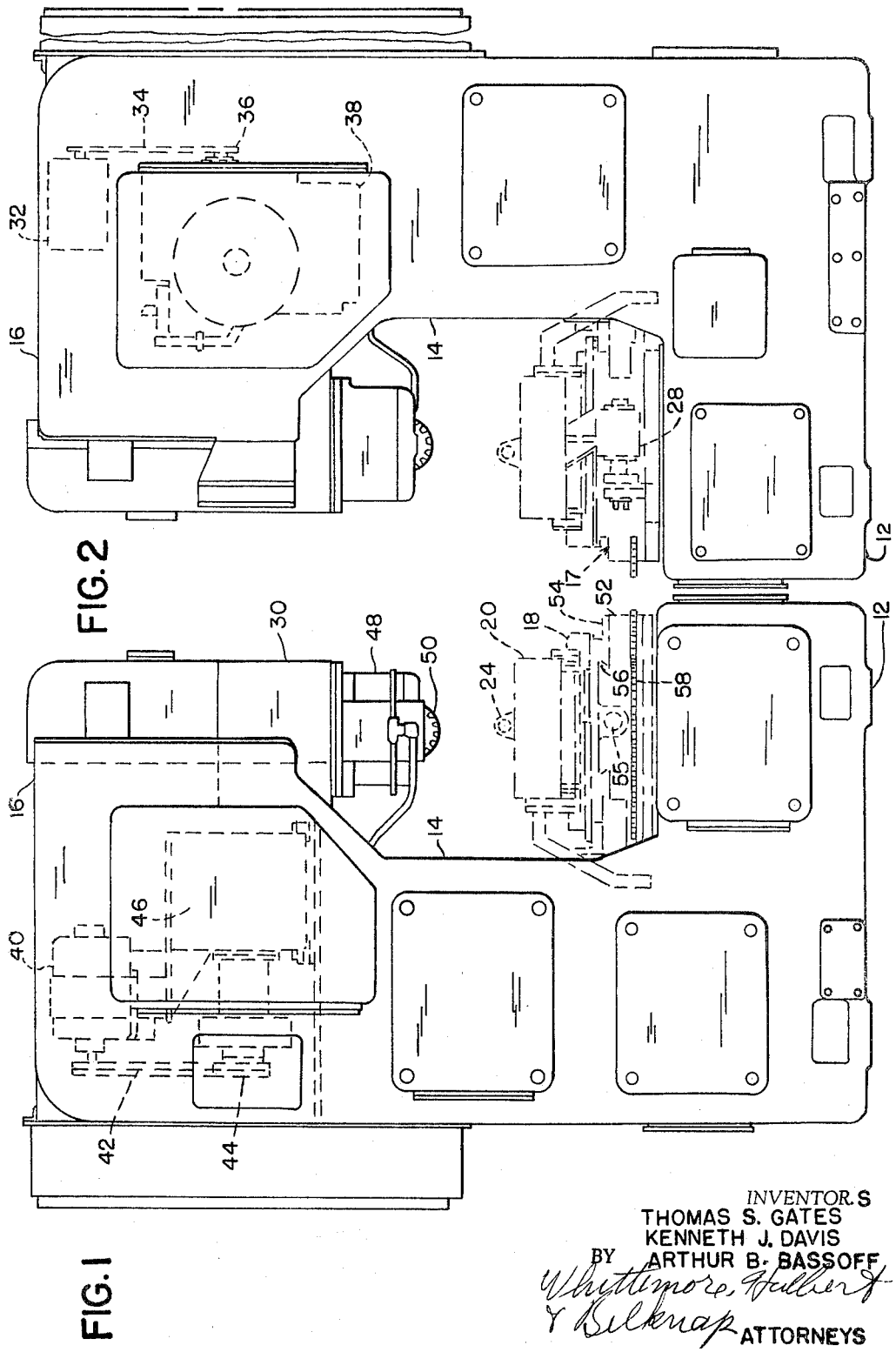
INVENTORS
THOMAS S. GATES
KENNETH J. DAVIS
BY ARTHUR B. BASSOFF
ATTORNEYS Sept. 13, 1966  T. S. GATES ETAL  3,272,075
GEAR FINISHING MACHINE
Filed Dec. 14, 1964  2 Sheets-Sheet 2

INVENTORS
THOMAS S. GATES
KENNETH J. DAVIS
ARTHUR B. BASSOFF
BY Whittemore, Hulbert
& Belknap
ATTORNEYS

United States Patent Office 3,272,075
Patented Sept. 13, 1966

3,272,075
GEAR FINISHING MACHINE
Thomas S. Gates, Grosse Pointe Woods, Kenneth J. Davis, Grosse Pointe, and Arthur B. Bassoff, Oak Park, Mich., assignors to National Broach & Machine Company, Detroit, Mich., a corporation of Michigan
Filed Dec. 14, 1964, Ser. No. 417,946
15 Claims. (Cl. 90—1.6)

This is a continuation-in-part of application Serial No. 186,994, filed April 12, 1962, now Patent No. 3,195,409.

The present invention relates to a gear finishing machine and more particularly to a machine designed for the purpose of carrying out a type of gear finishing, particularly gear shaving, known as diagonal traverse, in which means are provided for crowning the teeth of the work gear.

It is an object of the present invention to provide in a gear finishing machine of the character described a gear support table adapted to be rocked about an axis extending perpendicularly to the axis of a work gear thereon and to be reciprocated in a direction which is oblique to the axis of the work gear, including cam mechanism for rocking the table in timed relation to its reciprocation.

More specifically, it is an object of the present invention to provide camming mechanism as set forth in the preceding paragraph which comprises cam and cam follower members, and means for providing for sliding movement between one of said members and the table.

It is a further object of the present invention to provide a gear finishing machine comprising a frame, a slide mounted on the frame for rectilinear reciprocation in any direction in a plane, a table mounted on the slide for rocking movement about a rocking axis, a rotary work support on said table mounting a work gear for rotation about its axis, the axis of said rotary work support being perpendicular to said rocking axis, and cam mechanism connected between said frame and said rocking table including cam and cam follower members one of which is slidably associated with said rocking table.

More specifically, it is an object of the present invention to provide a cam and cam follower mechanism for effecting rocking movement of a table as it is traversed in different directions relative to a stationary support comprising an adjustable cam member having an elongated slot therein, a follower movable longitudinally of said slot, a pin connected to said follower for limited universal movement relative thereto, and a bracket in which said pin is longitudinally slidable.

Other objects and features of the invention will become apparent as the description proceeds, especially when taken in conjunction with the accompanying drawings, illustrating a preferred embodiment of the invention, wherein:

FIGURE 1 is a side elevational view of a gear finishing machine.

FIGURE 2 is an elevational view of the gear finishing machine from the opposite side.

As best seen in FIGURES 1 and 2, the machine comprises a base 12 and a vertically upwardly extending column 14 terminating at its upper end in a forwardly projecting portion 16 which partially overhangs the base 12. Mounted on the base 12 for angular adjustment about a vertical axis is a two-element sandwich 17. A slide 18 is connected to the upper element of the sandwich for horizontal reciprocation therewith as the upper sandwich element is reciprocated. The connection between the slide 18 and the upper sandwich element is a pivot means having a vertical axis to permit adjustment of the sandwich as a unit while the slide maintains its orientation. In order to maintain the orientation of the slide 18 as the sandwich is adjusted angularly, linkage is suitably connected to the slide 18 as will subsequently be described.

Figure 7:
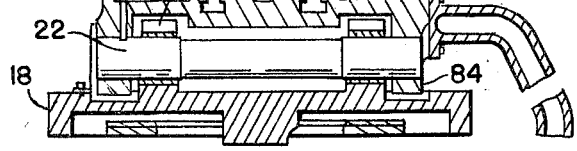
FIGURE 7 is a sectional view on the line 7—7, FIGURE 6.

A crowning table 20 is connected to the slide 18 for rocking movement relative thereto about a horizontal axis provided by a transversely extending pivot shaft 22, as best seen in FIGURE 7. The crowning table 20 carries head and tail stocks indicated diagrammatically at 24, these head and tail stocks being adjustably mounted in T-slots 26 best seen in FIGURES 5 and 7. The head and tail stocks support a work gear for rotation about its axis and it will be observed that the pivot axis of the crowning table, defined by the axis of the pivot shaft 22, is located below and extends perpendicularly to the axis of the work gear. Cam means indicated generally at 28 are provided which extend between and interconnect the crowning table 20 and the base 12.

Mounted at the forward side of the column 14 is a cutter head slide assembly 30 which is vertically movable thereon. The vertical adjustment of the cutter head slide assembly is by means of an upwardly extending feed screw and nut mechanism (not shown) extending between the cutter head slide assembly and the forwardly projecting portion 16 of the column 14.

Vertical movement of the cutter head slide assembly is accomplished by means of a cutter feed motor 32 connected by a belt 34 to a sheave 36 extending into the interior of a vertical feed housing 38. The vertical feed housing 38 includes mechanism not disclosed herein, which is adapted to effect rotation of the vertical feed screw previously referred to.

Also provided in the hollow interior of the column 14 is a cutter drive motor 40 connected by a belt 42 to a sheave 44 on a shaft extending outwardly of the cutter head and drive change gear housing 46.

At the lower end of the cutter head slide assembly there is provided the cutter head 48 carrying the gear-like cutter 50. The cutter head 48 is angularly adjustable about a vertical axis to provide for a crossed axes relationship between the cutter 50 and a work gear mounted between the head and tail stocks 24. Drive from the motor 40 to the cutter 50 is accomplished by suitable gearing (not shown herein).

The two-element sandwich 17 comprises a lower sandwich element 52 and an upper sandwich element 54, these elements being interconnected by rectilinear ways 56. Connected to the lower sandwich element 56 is a circular rack 58 by means of which the two-element sandwich 17 may be angularly adjusted about a vertical axis to cause the rectilinear ways 56 to extend in any selected direction in a horizontal plane. It will be understood that back and forth rectilinear reciprocation is provided between the sandwich elements 52 and 54 by suitable means such for example as a feed screw and nut as diagrammatically indicated at 55. As a result of the foregoing it is possible to cause the sandwich, and hence the upper slide 18 and the table 20 to be reciprocated back and forth in any direction in a horizontal plane. For example, the direction of reciprocation may be parallel to the axis of a work gear supported for rotation between the head and tail stocks 24. In this case the gear shaving operation which is performed is known as conventional. Alternatively, the sandwich may be adjusted so that the direction of reciprocation of the work gear is perpendicular to its own axis, in which case the gear finishing operation performed is known as underpass or overpass. If the direction of reciprocation of the work gear is in a direction oblique to the axis of the work gear, the gear finishing operation is known as diagonal traverse.

Referring now more particularly to FIGURES 3–7 there is shown the work supporting structure which is mounted on the upper sandwich element 54. The slide 18 has a depending cylindrical pilot 60 which is received in a pilot recess 62 formed in the upper sandwich element 54. This arrangement permits relative rotation about a vertical axis between the slide 18 and the upper sandwich element 54. Specifically, this relative rotation takes place when the sandwich as a whole is adjusted in a horizontal plane about a vertical axis to cause the ways 56 to extend in a desired direction, so as to provide a predetermined traverse angle.

Figure 3:
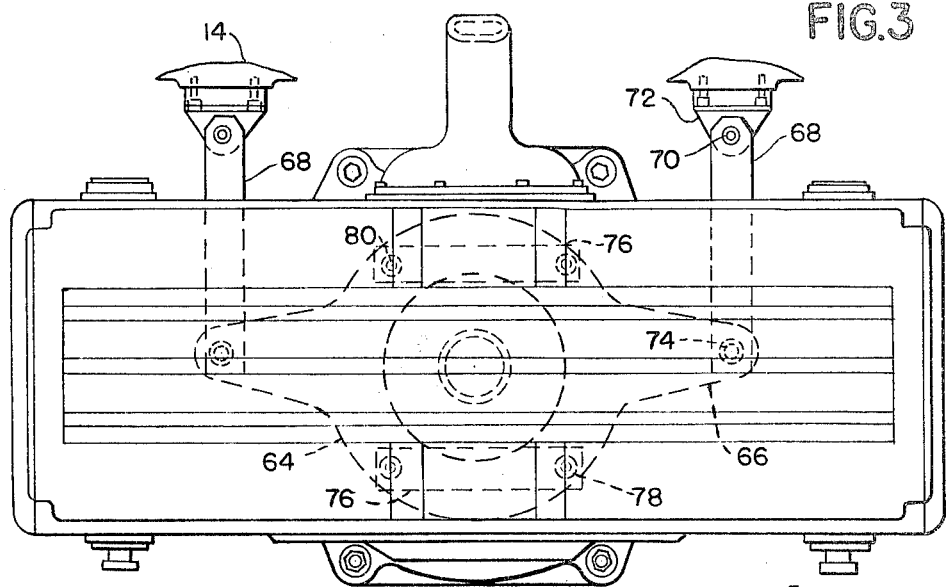
FIGURE 3 is a fragmentary plan view of the work support table.
Figure 4:
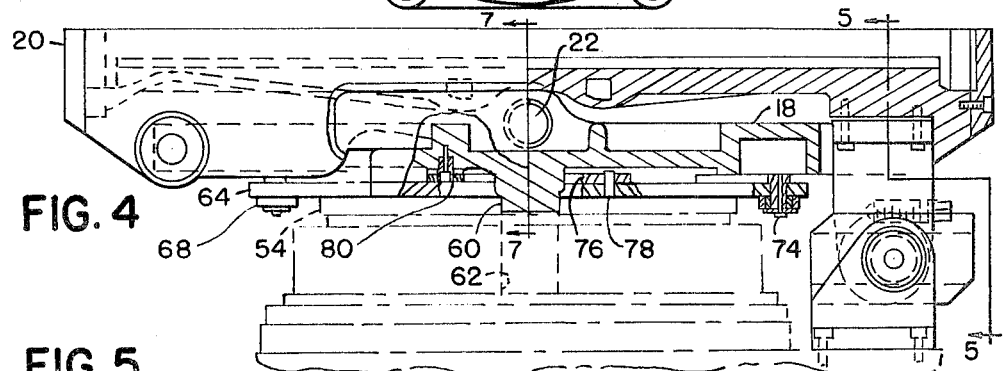
FIGURE 4 is a fragmentary elevational view, partly in section, of the work support table and support and camming means associated therewith.

The linkage means effective to maintain the orientation of the slide 18 with extreme accuracy as the intermediate sandwich 17 is adjusted, is best seen in FIGURES 3 and 4. This means comprises a parallel linkage and specifically, includes a spider 64 having laterally extending arms 66 connected by rigid links 68 to the column 14. The links 68 are provided with pivot connections 70 at one end thereof to brackets 72 which are bolted or otherwise secured to the column 14 of the machine frame. It will be observed in FIGURE 3 that the links are separated very substantially and this affords a high degree of precision in maintaining the slide 18 in oriented position. The opposite ends of the links 68 are pivoted as indicated at 74 to the laterally extending arms 66 of the spider 64.

In addition, a second pair of parallel links 76 is provided, these links being spaced as far apart as the machine configuration permits. As seen in FIGURE 3, the links 76 are pivoted at the right hand ends thereof as indicated at 78 to the spider 64. The left hand ends of the links 76 are pivoted as indicated at 80 to the underside of the slide 18.

Due to the parallel arrangement of the two pairs of links, it will be observed that as the slide 18 moves in any direction as occasioned by the particular adjustment of the sandwich 17, the slide 18 will be maintained in substantially exact orientation. Thus, in order to change the traverse angle it is only necessary to effect angular adjustment of the sandwich 17 by rotating a pinion in mesh with the circular rack 58. At this time the linkage just described holds the slide and crowning or work table 20 supported thereby against rotation about the vertical axis. After the sandwich has been adjusted to the desired position suitable clamping means are tightened, at which time the slide 18 may also be clamped to the upper sandwich element 54 by suitable clamping means (not shown). Thereafter, while the linkage remains connected it is of course unnecessary to maintain orientation of the slide 18 and table 20 as they are traversed by reciprocation of the upper sandwich element 54 on the lower sandwich element 52.

The shaft 22 which supports the table 20 for rocking movement to effect crowning of a gear carried thereby is located substantially midway between the ends of the table 20, as best seen in FIGURE 4. The slide 18, as best seen in FIGURE 7, includes a pair of upstanding lugs 82 in which the enlarged end portions of the shaft 22 are journaled. The rocking table 20 includes downwardly extending lugs 84 in which the ends of the shaft 22 are also journaled.

Means later to be described are provided for effecting a rocking motion of the crowning table 20 about the axis of the shaft 22 in timed relation to traverse occasioned by relative reciprocation between the upper and lower elements of the sandwich 17. In some cases it may be preferred to eliminate the crowning operation, in which case the crowning table is locked to prevent rocking movement thereof. For this purpose a pin 86 is provided which extends through a bushing 88 in the crowning table 20 and into a corresponding bushing 90 located in the slide 18. Opposite to the locking pin 86 there is a bearing pin 92 having a flat end surface engageable with a smooth side surface of the slide 18 to provide for smooth operation of the rocking or crowning table 20 when it is employed for crowning gears.

Figure 5:
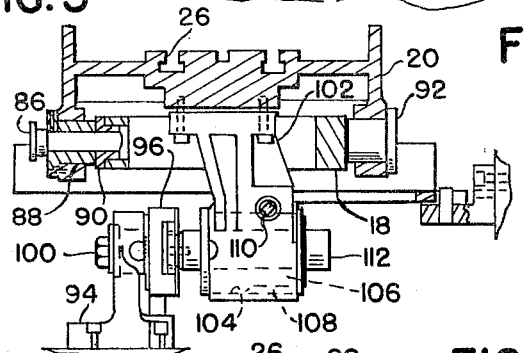
FIGURE 5 is a sectional view on the line 5—5, FIGURE 4.
Figure 6:
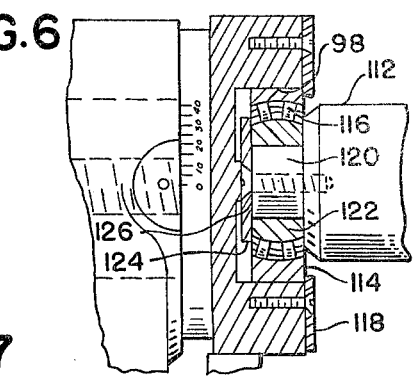
FIGURE 6 is an enlarged elevational view, partly in section, of the cam member.

In order to provide for rocking motion of the crowning table 20 which produces gear crowning, cam means illustrated generally at 28 are provided. These means are shown in detail in FIGURES 4, 5 and 6. The cam means comprises a bracket 94 as illustrated in FIGURE 5, and it includes a slotted block 96 having an elongated slot 98 (FIGURE 6) formed therein. The block 96 is angularly adjustable about the axis of a clamping screw 100. Bolted to the crowning table 20 adjacent one end thereof is a bracket 102 which at its lower end is provided with a circular opening 104 in which is received an adjustable eccentric sleeve 106. The sleeve 106 is provided with worm gear teeth indicated at 108 by means of which the eccentric sleeve may be rotated by a worm connected to a shaft having a squared end 110.

Within the sleeve 106 there is provided an elongated cylindrical pin 112 having at its inner end a member 114 forming the outer race of a self-aligning bearing including roller elements indicated at 116. The member 114 may have an external cylindrical surface which rolls along one side or the other of the cam slot 98. For this purpose the outside diameter of the member 114 is slightly smaller than the spacing between opposite sides of the slot 98. This clearance is kept small however, as for example on the order of a few thousandths of an inch. In some cases, instead of the outer surface of the member 114 being cylindrical and adapted to roll along one of the surfaces of the slot 98, the member may be elongated and have sliding contact with one or the other of the surfaces of the cam slot 98.

Overlying the edges of the member 114 are plates 118 which retain the member in the cam slot even though the angular adjustment of the sandwich causes the slide 18 to move diagonally toward and away from the bracket 94. For this reason the pin 112 is longitudinally slidable in the sleeve 106.

The inner end of the pin 112 is reduced as indicated at 120 and the inner race 122 of the spherical bearing, previously referred to, is clamped to the reduced end portion 120 by a plate 124 which is maintained in an accurate sliding fit with a ground guide surface of the rib 126 by plates 118.

As a result of the foregoing construction, when the sandwich is disposed so that its ways extend obliquely with respect to the cam groove or slot 98, reciprocation of the slide 18 will cause the eccentric bushing 106 to move longitudinally on the pin 112 since the self-aligning or spherical bearing at the inner end of the pin is retained in the cam slot by the plates 118. The provision of self-aligning prevents binding between the cam and cam follower even though the plane containing the cam slot is not exactly parallel to the axis of the work. It will be understood that the linkage which maintains the orientation of the slide 18 may not be exactly accurate, in which case rocking of the table 20 may be about an axis which is not exactly perpendicular to the vertical plane containing the cam slot 98. However, with the provision of the spherical bearing including the inner and outer races 122, 144, binding is prevented and a free cam action is obtained at all times.

It will be understood that the cam follower remains engaged with the cam slot at all times and where a crown is not desired, the cam block is adjusted to position the cam slot exactly horizontal. This eliminates the necessity of disassembling the parts, although of course where protracted operation without camming is to be carried out, it is practical if desired, to disassemble all or part of the crown-cam mechanism.

The drawings and the foregoing specification constitute a description of the improved gear finishing machine in such full, clear, concise and exact terms as to enable any person skilled in the art to practice the invention, the scope of which is indicated by the appended claims.

What we claim as our invention is:

1. A gear finishing machine comprising a frame, a first rotary support on said frame for mounting a gear-like member for rotation about its axis, means for angularly adjusting said first support about an axis perpendicular to and intersecting the axis of rotation of said first support, a rocking table on said frame movable bodily thereon in rectilinear reciprocation in any direction in a plane perpendicular to the axis of adjustment of said first rotary support, a second rotary support on said table having its axis of rotation in intermediate position of said table perpendicular and intersecting the axis of adjustment of said first rotary support, the rocking axis of said table being parallel to a plane which is parallel to the axes of rotation of both of said rotary supports, and perpendicular to the axis of rotation of said second rotary support, a first member rigid with said frame, a second member rigid with said table, cam and cam follower devices connected between said members, said cam device comprising an angularly adjustable body having parallel planar camming surfaces and being mounted on one of said members, said follower device comprising follower means movable longitudinally of the planar surfaces of said cam device, means on said cam device preventing relative separation movement between said means and said body in a direction parallel to the rocking axis of said table, an elongated pin connected to one of said devices, an elongated guide sleeve on one of said members in which said pin is longitudinally slidable, and a self-aligning bearing connecting said pin to said follower means.

2. A machine as defined in claim 1 in which said bearing is a spherical bearing connecting said pin to said part.

3. A gear finishing machine comprising a stationary support, angularly adjustable ways on said stationary support, a slide on said ways, a rocking support on said slide, cam means for rocking said rocking support in timed relation to traverse of said slide comprising a cam and follower device connected between said supports for actuation upon traverse of said slide, said cam including an elongated slot, said follower comprising a headed pin, means retaining the head of said pin in said slot, and guide means slidably supporting said pin on one of said supports, said guide means comprising an angularly adjustable eccentric bushing.

4. A gear finishing machine comprising a stationary support, angularly adjustable ways on said stationary support, a slide on said ways, a rocking support on said slide, cam means for rocking said rocking support in timed relation to traverse of said slide comprising a cam and follower device connected between said supports for actuation upon traverse of said slide, said cam including an elongated slot, said follower comprising a headed pin, means retaining the head of said pin in said slot, guide means slidably supporting said pin on one of said supports, the head of said pin comprising a roller, and self-aligning bearing means supporting said roller on said pin.

5. A gear finishing machine comprising a frame, angularly adjustable ways on said frame, a slide on said ways, a rotary support on said slide, a second rotary support on said frame, means mounting one of said supports for rocking movement about an axis perpendicular to and spaced laterally from its axis of rotation, means for rocking said rockable support in timed relation to movement of said slide comprising a cam and follower device connected to said rockable support for actuation upon traverse of said slide, said cam including an elongated slot, said follower comprising a headed pin, means retaining the head of said pin in said slot, a roller on said pin received in said slot, self-aligning spherical bearing means supporting said roller on said pin, and guide means slidably supporting said pin on said rockable support.

6. A gear finishing machine comprising a frame, angularly adjustable ways on said frame, a slide on said ways, a rotary support on said slide, a second rotary support on said frame, means mounting one of said supports for rocking movement about an axis perpendicular to and spaced laterally from its axis of rotation, means for rocking said rockable support in timed relation to movement of said slide comprising a cam and follower device connected to said rockable support for actuation upon traverse of said slide, said cam including an elongated slot, said follower comprising a headed pin, means retaining the head of said pin in said slot, and guide means slidably supporting said pin on said rockable support, said guide means comprising an angularly adjustable eccentric bushing.

7. A gear finishing machine comprising a frame, angularly adjustable ways on said frame, a slide on said ways, a rotary support on said slide, a secondary rotary support on said frame, means mounting one of said supports for rocking movement about an axis perpendicular to and spaced laterally from its axis of rotation, means for rocking said rockable support in timed relation to movement of said slide comprising a cam and follower device connected to said rockable support for actuation upon traverse of said slide, said cam including an elongated slot, said follower comprising a headed pin, means retaining the head of said pin in said slot, guide means slidably supporting said pin on said rockable support, the head of said pin comprising a roller, and self-aligning spherical bearing means supporting said roller on said pin.

8. In a gear finishing machine a frame, a work table, a rotary work support on said table, means for reciprocating said table in any direction in a plane parallel to the axis of said support, means mounting said table for limited rocking movement about an axis parallel to said plane and perpendicular to the axis of said support, a member rigid with said frame, a second member rigid with said table and spaced from the rocking axis thereof, cam and cam follower devices intermediate said members, one of said devices being slidably connected to one of said members, said cam device being slotted, said follower device including a part movable in the slot of said cam device, and means to provide sliding movement between said one device and said one member to maintain said part in said slot when the direction of reciprocation is oblique to the axis of said rotary support, the means to maintain said part in said slot comprising keeper means over-lying said slot and engageable by said part, said one device comprising an elongated element pivotally connected at one end to said one device.

9. Apparatus as defined in claim 8 comprising a sleeve on said one member in which said element is slidable longitudinally.

10. Apparatus as defined in claim 9 in which said sleeve is eccentric, and means for rotatably adjusting said sleeve to tilt said table.

11. A gear finishing machine comprising a frame, a first rotary support on said frame for mounting a gear-like member for rotation about its axis, means for angularly adjusting said first support about an axis perpendicular to and intersecting the axis of rotation of said first support, a slide on said frame, means intermediate said frame and slide for providing a relatively slow rectilinear reciprocation of said slide in any direction in a plane perpendicular to the axis of angular adjustment of said first rotary support, a second rotary support on said slide for mounting a gear-like member for rotation about its axis in mesh with the gear-like member on said first rotary support, means mounting said second rotary support on said slide for limited rocking movement about a rocking axis parallel to the plane containing the direction of reciprocation of said slide and perpendicular to and spaced laterally from the axis of rotation of said second rotary support, a member rigid with said frame, a member rigid with said second rotary support and spaced substantially from the rocking axis thereof, and camming means connected between said members and comprising cam and cam follower devices, said cam device comprising an adjustable slotted body on one of said members, said follower device comprising a part movable longitudinally in the slot of said cam device, means on said cam device preventing movement of said part out of said slot, an elongated pin connected to one of said devices and slidably connected to the other of said members, an elongated guide sleeve on said other member in which said pin is slidable longitudinally, and a self-aligning bearing connecting said pin to said one device.

12. A machine as defined in claim 11 in which said bearing is a spherical bearing.

13. A machine as defined in claim 11 in which said sleeve is eccentric and rotatable about its axis to effect tilting of said second rotary support about its rocking axis.

14. A gear finishing machine comprising a frame including a base and column, a rotary tool support having a horizontal axis of rotation, means mounting said support for angular adjustment about a vertical axis intersecting said axis of rotation, a work slide on said base, means mounting said work slide for relatively slow reciprocation in any direction in a horizontal plane, a crowning table on said slide mounted for rocking movement about a horizontal axis, a rotary work support on said table having an axis of rotation which is horizontal when said table is in mid-position, a member rigid with said frame, a member rigid with said table and spaced from the rocking axis thereof, cam and cam follower devices connected between said members, said cam device being slotted, said cam follower device comprising a part movable longitudinally in said slot, means preventing movement of said part out of said slot, an elongated pin connected to said part and longitudinally slidably connected to one of said members, and a self-aligning bearing connecting said pin to said part.

15. A machine as defined in claim 14 comprising an elongated eccentric sleeve on said one member in which said pin is slidable, and means for adjusting said sleeve about its axis to tilt said table.

References Cited by the Examiner
UNITED STATES PATENTS

| 2,157,981 | 5/1939 | Drummond | 90—1.6 |
| 3,115,064 | 12/1963 | Rogg | 90—1.6 |

WILLIAM W. DYER, Jr., *Primary Examiner.*

G. A. DOST, *Assistant Examiner.*